Figure 1:
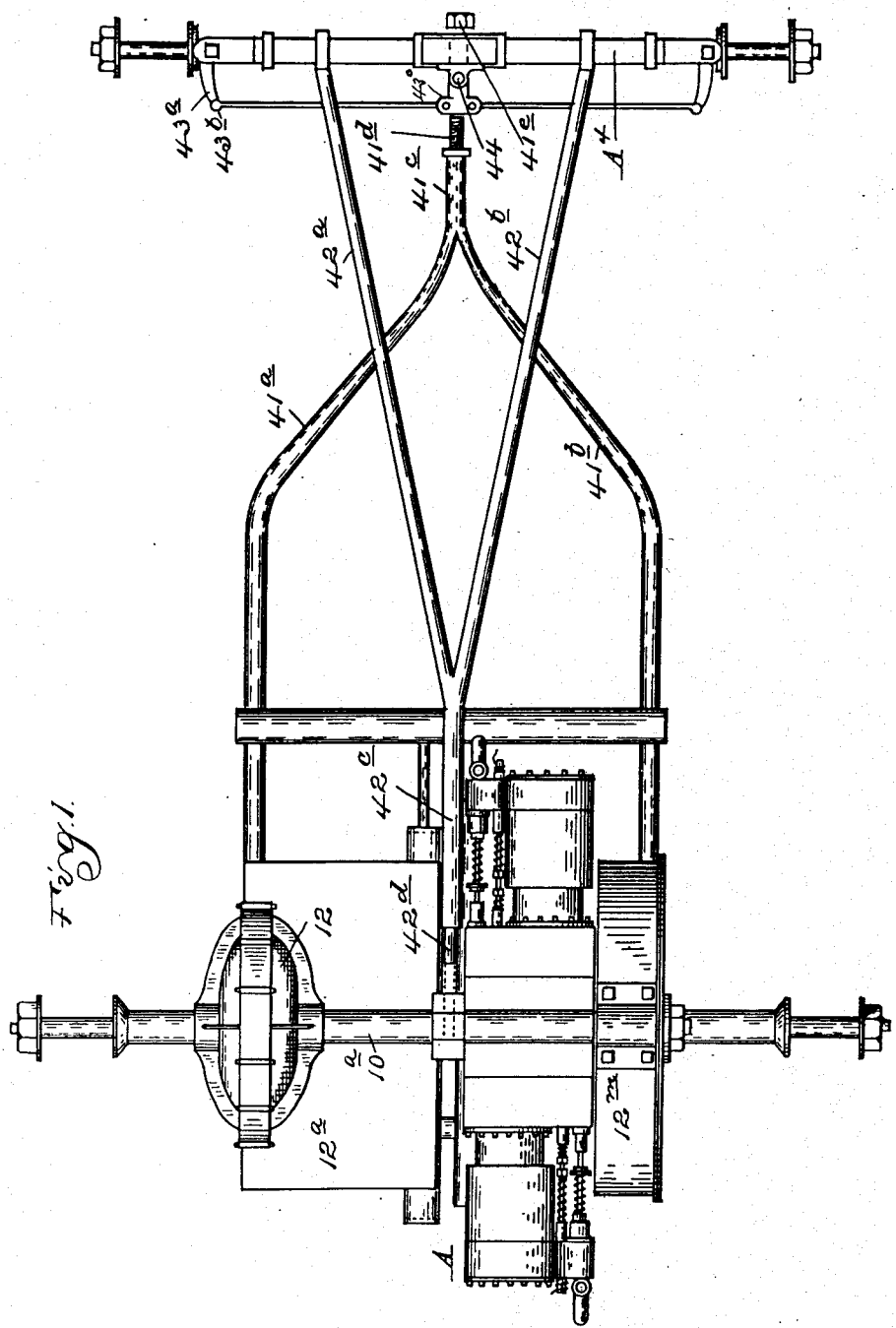

No. 686,046. Patented Nov. 5, 1901.
H. FORD.
MOTOR CARRIAGE.
(Application filed Sept. 12, 1899.)

(No Model.) 3 Sheets—Sheet 1.

Witnesses
H. C. Smith
[signature]

Inventor
Henry Ford
By [signature]
Attys.

No. 686,046. Patented Nov. 5, 1901.
H. FORD.
MOTOR CARRIAGE.
(Application filed Sept. 12, 1899.)
(No Model.) 3 Sheets—Sheet 2.
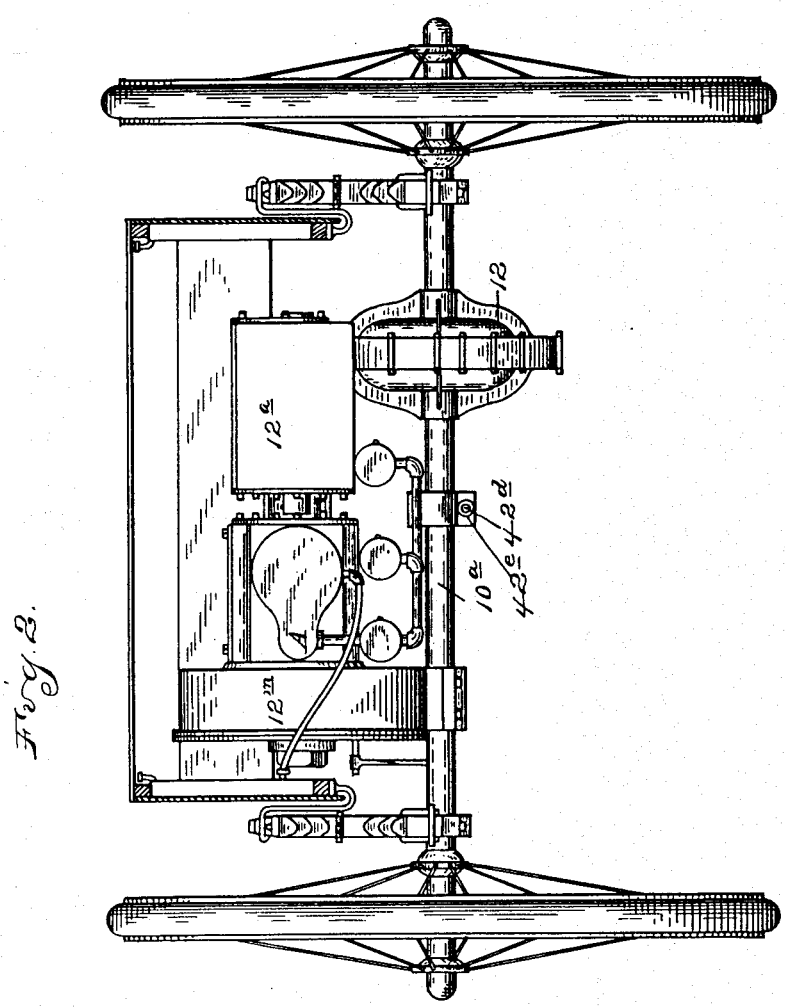
Witnesses
H. C. Smith.
Inventor
Henry Ford
By
Att'ys.

No. 686,046. Patented Nov. 5, 1901.
H. FORD.
MOTOR CARRIAGE.
(Application filed Sept. 12, 1899.)
(No Model.) 3 Sheets—Sheet 3.
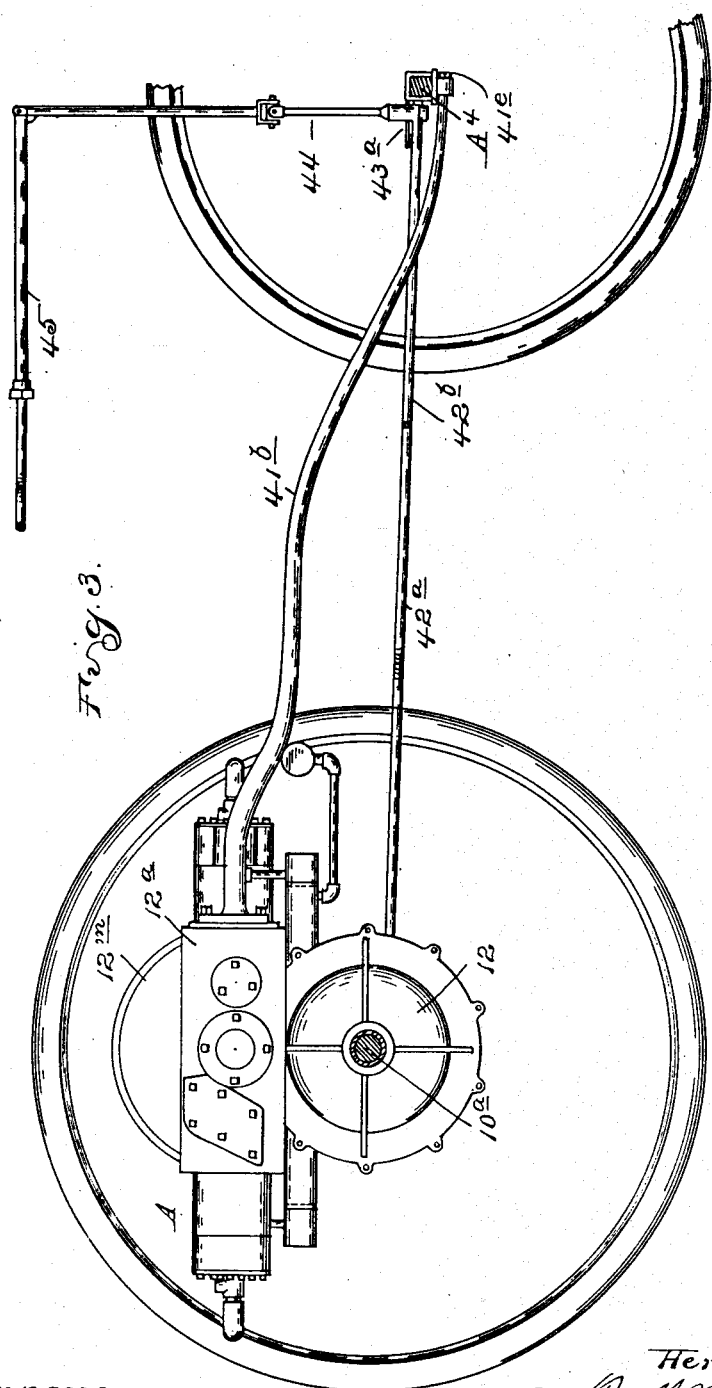
Witnesses
H. C. Smith.
W. W. Dougherty.
Inventor
Henry Ford
By [signature]
Attys.

UNITED STATES PATENT OFFICE.

HENRY FORD, OF DETROIT, MICHIGAN, ASSIGNOR TO THE DETROIT AUTOMOBILE COMPANY, OF DETROIT, MICHIGAN, A CORPORATION OF MICHIGAN.

MOTOR-CARRIAGE.

SPECIFICATION forming part of Letters Patent No. 686,046, dated November 5, 1901.

Original application filed December 8, 1898, Serial No. 698,599. Divided and this application filed September 12, 1899. Serial No. 730,222. (No model.)

*To all whom it may concern:*

Be it known that I, HENRY FORD, a citizen of the United States, residing at Detroit, in the county of Wayne and State of Michigan, have invented certain new and useful Improvements in Motor-Carriages, of which the following is a specification, reference being had therein to the accompanying drawings.

The invention relates to a motor-carriage, and has for its object an improvement in the vehicle itself comprising an improved reach-rod and connections between the reach-rods and axles, an improved means of changing the angles between the front wheels and the carriage-body, and thereby changing the direction of the progressive motion of the vehicle, all as more fully hereinafter described.

This application is a divisional application of my pending application filed December 8, 1898, Serial No. 698,599.

In the drawings, Figure 1 is a bottom plan view of my improved vehicle, showing the rear axle, on which rests the frame of the engine, the gear-cases, and detached plan of the front axle and the levers used to change the vertical axis of the front wheels. Fig. 2 is a rear elevation of the rear axle with the motor thereon. Fig. 3 is a side elevation thereof.

The engine may be of any improved style of explosive-engine and is shown at A. At one side of the engine and connected thereto is a gear-case $12^a$, which in turn is connected to a gear-case 12 on the rear axle $10^a$. In the gear-cases $12^a$ and 12 is suitable gearing for connecting the drive-shaft of the engine with the rear axle. At the other side of the engine is a fly-wheel casing $12^m$, secured, as shown in Figs. 1 and 2, to the rear axle and also secured to the engine-frame.

The wagon has two axles, and the forward axle instead of turning on a fifth-wheel is for most of its length fixed in a constant position, so as to be always parallel with the rear axle, except, however, that it is able to oscillate somewhat in a vertical plane parallel to that passing vertically through the rear axle. It can move with an oscillatory movement around its middle point. The amount of movement is not great, but is sufficient to enable the carriage to accommodate itself to ordinary inequalities of the road. The reach is made of two parts, each part being Y-shaped. The spreading ends $41^a$ and $41^b$ of that part of the reach which is secured to the rear axle are made fast to the rear axle between the middle and the ends thereof. The stem $41^c$ of this part of the reach is provided at its forward end with a journal $41^d$, that engages through a bearing or eye beneath the front axle $A^4$. That part of the reach which is made fast to the forward axle is also Y-shaped, with its two spreading ends $42^a$ and $42^b$ secured to the forward axle, and the stem part $42^c$ is likewise provided with a journal $42^d$, which engages through a similar eye or bearing under the rear axle. The journals of each part project beyond the bearing and are threaded, so that the two axles of the wagon are held together by the nuts $41^e$ and $42^e$.

The steering is effected by shifting the angles of the forward wheel with respect to the forward axle. At each end of the axle the journal part thereof is made in a separate piece from the body part, and each journal part is secured to the body part of the axle by a pin which passes vertically through knuckles or lugs on the parts. Each journal part is provided with an angled extension $43^a$, that extends to the rear and terminates with an eye $43^b$, into which is hooked a link reaching to an arm $43^c$, that extends rearward from the vertical post 44 of the guiding-lever 45.

What I claim as my invention is—

1. In a motor-carriage, provided with a forward axle, having the two forward vehicle-wheels engaged therewith by vertical joint connections, a reach-rod consisting of two bars, one of which engages by a horizontal pivot connection at the middle point of the front axle, and spreads to a double connection with the rear axle, and the other of which engages by a horizontal pivot connection at the middle point of the rear axle and spreads to a double connection with the front axle, substantially as described.

2. In a motor-vehicle, in combination with the front and rear axle, a compound reach-rod, consisting of two bars one of which engages by a journal connection at the middle point of the rear axle, and spreads to a double connection with the front axle, and the other of which engages by a single journal connection at the middle point of the front axle, and spreads to a double connection with the rear axle, substantially as described.

3. In a vehicle, a front axle bearing the steering-wheels, and a rear driving-axle bearing a driving-wheel, a frame rigidly connected with said driving-axle and loosely connected with the front axle, and branching rods rigidly connected at or near the extremities of the front axle and loosely connected with the rear axle at the middle, which hold said front axle in parallelism with the rear axle, yet permit said axles to rock or tilt independently, substantially as described.

In testimony whereof I affix my signature in presence of two witnesses.

HENRY FORD.

Witnesses:
 M. B. O'DOGHERTY,
 H. C. SMITH.